US012116309B2

(12) United States Patent
Oldfield

(10) Patent No.: US 12,116,309 B2
(45) Date of Patent: Oct. 15, 2024

(54) TOUGHENABLE COATED SUBSTRATE

(71) Applicant: PILKINGTON GROUP LIMITED, Lathom (GB)

(72) Inventor: John William Oldfield, St. Helens (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 17/630,962

(22) PCT Filed: Jul. 31, 2020

(86) PCT No.: PCT/GB2020/051855
§ 371 (c)(1),
(2) Date: Jan. 28, 2022

(87) PCT Pub. No.: WO2021/019257
PCT Pub. Date: Feb. 4, 2021

(65) Prior Publication Data
US 2022/0267199 A1 Aug. 25, 2022

(30) Foreign Application Priority Data
Aug. 1, 2019 (GB) ...................................... 1910988

(51) Int. Cl.
*B32B 15/04* (2006.01)
*B32B 17/06* (2006.01)
*C03C 17/36* (2006.01)
(52) U.S. Cl.
CPC ...... *C03C 17/3644* (2013.01); *C03C 17/3626* (2013.01); *C03C 17/366* (2013.01); *C03C 2218/365* (2013.01)
(58) Field of Classification Search
CPC .................. C03C 2218/365; C03C 17/366
USPC ................................................ 428/432, 434
See application file for complete search history.

(56) References Cited

U.S. PATENT DOCUMENTS

| 5,891,556 | A   * | 4/1999  | Anderson ................ C03C 27/10 359/359 |
| 6,610,410 | B2 * | 8/2003  | Ebisawa ............. C03C 17/3642 52/204.5 |
| 6,918,957 | B2   | 7/2005  | Kursawe et al. |
| 6,994,910 | B2   | 2/2006  | Stachowiak |
| 7,128,944 | B2   | 10/2006 | Becker et al. |
| 7,192,647 | B2   | 3/2007  | Hartig |
| 7,241,505 | B2   | 7/2007  | Glaubitt et al. |
| 7,575,809 | B2   | 8/2009  | Glaubitt et al. |
| 7,687,148 | B2 * | 3/2010  | Rimmer ................ C03C 17/366 428/432 |
| 9,255,030 | B2 * | 2/2016  | Hartig ................. C03C 17/3613 |
| 9,556,066 | B2   | 1/2017  | Frank et al. |
| 10,472,880 | B2  | 11/2019 | Frank et al. |
| 10,494,859 | B2  | 12/2019 | Frank et al. |
| 2003/0039843 | A1 * | 2/2003 | Johnson ............... C03C 17/3417 65/32.4 |
| 2003/0165693 | A1 | 9/2003 | Hartig et al. |
| 2005/0026002 | A1 | 2/2005 | Hartig |
| 2005/0106397 | A1 | 5/2005 | Krisko et al. |
| 2005/0205416 | A1 | 9/2005 | Stachowiak |
| 2006/0124449 | A1 | 6/2006 | Hartig et al. |
| 2007/0031681 | A1 * | 2/2007 | Anzaki ............... C03C 17/3417 428/432 |
| 2007/0237968 | A1 * | 10/2007 | Kijima .................... C03C 17/36 428/432 |
| 2009/0084438 | A1 * | 4/2009 | den Boer ........ H01L 31/022466 136/256 |
| 2010/0136365 | A1 * | 6/2010 | Unquera ............. C03C 17/3626 428/215 |
| 2013/0089684 | A1 * | 4/2013 | Pesce ........................ E04B 1/78 428/428 |
| 2013/0149473 | A1 * | 6/2013 | Frank ...................... C03C 17/36 29/458 |

(Continued)

FOREIGN PATENT DOCUMENTS

CN 1812940 A 8/2006
DE 10146687 C1 6/2003
(Continued)

OTHER PUBLICATIONS

UK Intellectual Property Office, GB Search Report, issued in GB1910988.3, dated Dec. 24, 2019, one page, UK Intellectual Property Office, Newport, South Wales.
European Patent Office, International Search Report with Written Opinion, issued in PCT/GB2020/051855, dated Sep. 30, 2020, 13 pages, European Patent Office, Rijswijk, Netherlands.
United Kingdom Intellectual Property Office, Search Report in Application No. GB1910988.3, dated May 20, 2020.
(Continued)

*Primary Examiner* — Lauren R Colgan
(74) *Attorney, Agent, or Firm* — Marshall & Melhorn, LLC

(57) ABSTRACT

The present invention relates to a toughenable coated float glass substrate, a method of preparing same and the use thereof, said float glass substrate comprising a first surface and a second surface, wherein the first surface comprises one or more layers applied by chemical vapour deposition (CVD) and the second surface comprises one or more layers applied by physical vapour deposition (PVD); and wherein said one or more layers applied by physical vapour deposition (PVD) includes at least one functional metal layer; and wherein the second surface further comprises a protective layer applied in direct contact with the second surface; and wherein the coated float glass substrate exhibits a transmission b* colour value according to the CIE colour space of less than or equal to 3 and an external reflection b* of less than or equal to −5.

15 Claims, No Drawings

(56) References Cited

U.S. PATENT DOCUMENTS

| | | | |
|---|---|---|---|
| 2014/0193616 A1* | 7/2014 | Polcyn | C03B 33/02 83/13 |
| 2014/0199552 A1* | 7/2014 | Clabau | C03C 17/3411 428/428 |
| 2016/0031750 A1* | 2/2016 | Ridealgh | C03C 17/3644 428/428 |
| 2016/0257611 A1* | 9/2016 | Noethe | C03C 17/3644 |
| 2018/0009703 A1* | 1/2018 | Hayashi | H05B 3/688 |

FOREIGN PATENT DOCUMENTS

| | | |
|---|---|---|
| EP | 1328483 B1 | 12/2005 |
| EP | 1429997 B1 | 7/2007 |
| WO | WO2004/063111 A1 | 7/2004 |
| WO | WO2004/108619 A1 | 12/2004 |
| WO | WO2005/003049 A1 | 1/2005 |
| WO | WO2008/075107 A1 | 6/2008 |
| WO | 2011077157 A1 | 6/2011 |
| WO | 2017119279 A1 | 7/2017 |

OTHER PUBLICATIONS

United Kingdom Intellectual Property Office, Search Report in Application No. GB1910988.3, dated Dec. 30, 2019.
China National Intellectual Property Administration, Office Action in Application No. CN 202080065106.7, dated Nov. 9, 2023.

* cited by examiner

TOUGHENABLE COATED SUBSTRATE

BACKGROUND OF THE INVENTION

The present invention relates to toughenable coated substrates and to a process for the manufacture of same. More specifically, the invention relates to toughenable, coated glass substrates and to a process for preparing same in which one or more layers are applied to each side of the substrate to form a coated substrate which is then toughened, by heat treatment, without significant damage to the coating layers on each side of the substrate.

It is known to deposit layers or coatings on substrates such as glass for various purposes. For example, sol gel type deposition processes are disclosed in each of EP 1429997, DE 10146687, EP1328483 and U.S. Pat. No. 6,918,957, wherein a silica sol is applied to the surface of a substrate and the substrate then heated at an elevated temperature to 'drive-off' organic material, resulting in the production of a silica coating.

Other types of deposition processes include for example chemical vapour deposition (CVD), whereby a vapour of a precursor is directed towards the surface of a substrate, often at elevated temperature.

Processes for depositing conductive oxides such as indium tin oxide, doped tin oxide, doped zinc oxide and doped cadmium oxide are also known. These processes may include for example but are not limited to: chemical vapour deposition (CVD), flame pyrolysis, sputtering, or other types of physical vapour deposition.

Glass coatings which provide low emissivity and/or for solar control may be deposited by physical vapour deposition processes, for example, sputtering.

Sputtered low emissivity (low-e) and solar control coating stacks applied to a glass substrate are commonly made up of repeating sequences based on:

dielectric layer sequence/(Ag/dielectric layer sequence)$^n$,
with each of the n dielectrics layers possibly varying in thicknesses and/or composition. The value of n may be 1 or 2 and even 3 or 4.

It is also known to coat both sides of glass substrates to produce glazing units for architectural glazing markets. Indeed, products are available which use the technologies described above to coat for instance, first one side of a glass substrate and then another. For example, NSG produce coated glass products in which one side of the glass substrate is coated with a self-cleaning or anti-reflective coating, applied by chemical vapour deposition (CVD), and the other side of the glass substrate is coated with a physical vapour deposition (PVD) (sputtered) low emissivity coating.

Alternative products exist in which a low-emissivity coating is applied to each side of a glass substrate, but wherein one of the low-emissivity coatings is applied by chemical vapour deposition and the other low-emissivity coating is applied by sputtering.

However, thermally tempering or toughening, many coated glass products prepared using the technologies described above is difficult to achieve without damaging the coating layers, thereby leading to inferior products in terms of either a lack of colour uniformity or visual clarity.

In toughened or tempered glass, a glass substrate is processed by a controlled thermal or chemical treatment, to increase its strength compared with normal glass. The act of tempering or toughening places the outer surfaces of the glass substrate into compression and the inner body of the glass substrate into tension. When the toughened or tempered glass is broken, in contrast to glass plate (also known as annealed glass), the induced stresses cause the toughened glass to crumble into small granular chunks instead of splintering into jagged shards.

Coated glass panes which are toughened to impart safety properties and/or bent, are desirable for a large number of applications in both architectural and motor vehicle glazings. It is known that for thermally toughening and/or bending glass panes it is necessary to process the glass panes by a heat treatment at temperatures near or above the softening point of the glass used and then either to toughen them by rapid cooling or to bend them with the aid of bending means. The relevant temperature range for standard float glass of the soda lime silica type is typically about 580-690° C., the glass panes being kept in this temperature range for several minutes before initiating the actual toughening and/or bending process.

"Heat treatment", "heat treated" and "heat treatable" in the following description and claims refer to thermal bending and/or toughening processes such as mentioned above and to other thermal processes during which a coated glass pane reaches temperatures in the range of about 580-690° C. for a period of several minutes, for example, for up to about 10 minutes. A coated glass pane is deemed to be heat treatable if it survives a heat treatment without significant damage, typical damages caused by heat treatments being high haze values, pinholes or spots.

The term or parameter "haze" often referred to in the glass industry when characterising the heat treatability of low-emissivity (low-e) and/or solar control coatings is often insufficient, as it does not fully reflect all types of defects that may arise during coating, heat treating, processing and/or handling of coated glass panes. For example, some known heat treatable coated glass panes show significant and clearly noticeable modifications to their optical properties and particularly their reflection colour during and after heat treatment.

Therefore, there is a desire to maintain the thermal and optical properties of coated glass panes both before, and after heat treatment. This may be characterised by maintenance of similar sheet resistance values both before and after the heat treatment, or in some cases, by actually obtaining a lower level of sheet resistance for the coated glass pane after heat treatment.

Whilst products do exist in which a glass substrate (which may be toughened or simply annealed) is coated on one side with a coating applied by chemical vapour deposition (CVD) and on the other side with a sputtered solar control coating, such products are often limited in their applicability, being unable to compete with the performance offered by coated glass substrates which comprise silver anti-reflective layer applied by PVD.

In the float glass process, a continuous strip of molten glass is poured from a furnace onto a large shallow bath of molten metal to form a float glass ribbon. Tin is usually used as the molten metal. The glass floats on the tin and as the glass cools, it spreads out to form a flat surface. Rollers are used across the top of the glass, to pull or stretch the glass to the required thickness of glass sheet. The surface of the glass sheet which is in contact with the tin during production is traditionally known as the 'tin' side of the glass sheet or substrate. The opposite surface of the glass sheet which is in contact with an atmosphere of hydrogen and nitrogen generated in the bath is traditionally known as the 'air' side.

During the float process, it is usual to move glass from the bath into the lehr for annealing using steel lift out rollers. However, as the glass is still soft as it is removed by the steel rollers, it is particularly prone to damage. It is typical for such damage to appear as visible mottling, streaking and lines on the surface if the glass. The damage obviously compromises the aesthetic appearance of the final glass product which either has to be sold at a reduced cost or in the worse cases, discarded completely and recycled.

In addition, the imperfections described above on the surface of the glass substrate which appear during production are often exacerbated further when one or more coatings layers are applied to the tin side of the glass substrate. This is especially the case if the glass is subsequently heat treated (or tempered).

DETAILED DESCRIPTION OF THE INVENTION

The present invention therefore seeks to address the appearance of such damage to the surface of the glass substrate and thereby not only meet the required aesthetic appearance of the glass but also deliver the properties of glass required in both the architectural and automotive industries.

In addition, whilst the present invention is directed to a process for producing coated float glass with acceptable parameters and appearance when viewed from both sides, the invention is also applicable to the protection of other glass substrates such as toughened glass, chemically strengthened glass available from NSG under the tradename Glanova™, and borosilicate glass.

Therefore, according to a first aspect of the present invention there is provided a toughenable coated float glass substrate, said float glass substrate comprising:
i) a first surface; and
ii) a second surface, wherein
the first surface comprises one or more layers applied by chemical vapour deposition (CVD) and the second surface comprises one or more layers applied by physical vapour deposition (PVD); and wherein
said one or more layers applied by physical vapour deposition (PVD) includes at least one functional metal layer; and wherein
the second surface further comprises a protective layer applied in direct contact with the second surface; and wherein
the coated float glass substrate exhibits a transmission b* colour value according to the CIE colour space of less than or equal to 3 and an external reflection b* of less than or equal to −5.

Preferably, for the toughenable coated substrate according to the first aspect of the present invention, the protective layer comprises a layer of silicon oxide (SiOx), wherein x is in the range 1.5 and 2.0.

According to the CIE colour space, the toughenable coated substrate according to the present invention preferably comprises a b* and a* value which are both negative with respect to external reflection. That is, the b* value is in the blue region of the CIE colour space and the a* value is in the green region of the CIE colour space.

Also, in relation to the first aspect of the present invention the protective layer is preferably applied by physical vapour deposition (PVD).

Preferably, the thickness of the protective layer is in the range 10 to 100 nm. More preferably the thickness of the protective layer is in the range 15 to 80 nm. Even more preferably the thickness of the protective layer is in the range 30 to 70 nm. Most preferably however, the thickness of the protective layer is in the range of 40 to 70 nm. Alternatively, the thickness of the protective layer may be in the range of 30 to 60 nm, or even, 50 to 60 nm.

It is preferred in relation to the first aspect of the present invention that for the toughenable coated substrate the second surface of the float glass contacted molten tin during manufacture and the first surface of the float glass contacted a bath atmosphere of nitrogen and hydrogen during manufacture.

Also, in relation to the toughenable coated substrate according to the first aspect of the present invention, it is preferred that the one or more layers applied by chemical vapour deposition (CVD) to the first surface of the glass substrate comprise one or more doped or undoped oxide layers selected from:

silicon oxide ($SiO_2$), tin oxide ($SnO_2$), fluorine doped tin oxide ($SnO_2$:F), titanium oxide ($TiO_2$) and antimony doped tin oxide ($SnO_2$:Sb).

Preferably, the one or more layers applied to the second surface of the toughenable coated substrate by physical vapour deposition (PVD) comprises a functional metal layer. It is preferred that the functional metal comprises silver.

In addition, in relation to the toughenable coated substrate according to the present invention, the one or more layers applied by physical vapour deposition (PVD) preferably includes at least one absorbing layer based on Ti, V, Cr, Fe, or W, Ni Nb, and alloys thereof and nitrides. Most preferably, the at least one absorbing layer comprises tungsten (W), preferably tungsten nitride.

Further in relation to the toughenable coated substrate according to the first aspect of the present invention, it is preferred that the change in colour for transmission after heat treatment ($\Delta E^*$) for the coated substrate is less than or equal to 10. More preferably, it is preferred that the change in colour for transmission after heat treatment ($\Delta E^*$) for the coated substrate is less or equal to 8 or 7. Most preferably, it is preferred that the change in colour for transmission after heat treatment ($\Delta E^*$) for the coated substrate is less or equal to 5.

In addition, in relation to the toughenable coated substrate according to the first aspect of the present invention, it is preferred that the change in colour for reflection after heat treatment ($\Delta E^*$) for each side of the coated substrate is less than or equal to 10. More preferably, it is preferred that the change in colour for reflection after heat treatment ($\Delta E^*$) for each side of the coated substrate is less than or equal to 8 or 7. Most preferably, the change in colour for reflection after heat treatment ($\Delta E^*$) for each side of the coated substrate is less than or equal to 5.

According to a second aspect of the present invention there is provided a process for preparing a dual coated toughenable float glass substrate according to the first aspect of the present invention comprising the steps of:
i) providing a float glass substrate with a first surface and a second surface, wherein the second surface of the glass substrates contacts molten tin during manufacture and the first surface contacts a bath atmosphere of nitrogen and hydrogen during manufacture;
ii) depositing by chemical vapour deposition (CVD) one or more layers on the first surface of the substrate; and
iii) depositing by physical vapour deposition (PVD) one or more layers on the second surface of the substrate; and
iv) depositing by physical vapour deposition (PVD), a protective layer directly on the glass substrate prior to depositing the one or more layers on the second surface, wherein the protective layer comprises a thickness of between 10 nm and 100 nm; and v) heat treating the coated glass substrate to toughen the glass without degrading the one or more layers deposited on each side of the substrate.

In relation to the second aspect of the present invention it is preferred that the protective layer comprises a layer of silicon oxide (SiOx), wherein x is between 1.5 and 2.0.

In addition, it is preferred that the one or more layers deposited by physical vapour deposition (PVD) on the second surface of the substrate comprises a functional metal layer. Most preferably the functional metal layer comprises silver.

Also, in relation to the second aspect of the present invention it is preferred if the protective layer is deposited to a thickness of from 30 nm and 70 nm. Preferably, the thickness of the protective layer is deposited in the range 10 to 100 nm. More preferably the thickness of the protective layer is deposited in the range 15 to 80 nm. Even more preferably the thickness of the protective layer is deposited in the range 30 to 70 nm. Most preferably however, the thickness of the protective layer is deposited in the range of 40 to 70 nm. Alternatively, the thickness of the protective layer may be deposited in the range of 30 to 60 nm, or even, 50 to 60 nm.

Preferably, the one or more layers applied by chemical vapour deposition (CVD) to the first surface of the substrate comprise one or more layers selected from:

silicon oxide ($SiO_2$), tin oxide ($SnO_2$), fluorine doped tin oxide ($SnO_2$:F), titanium oxide ($TiO_2$) and antimony doped tin oxide ($SnO_2$:Sb).

In the process according to the second aspect of the present invention, the layers deposited by physical vapour deposition (PVD) layer to the second surface of the substrate may be deposited after application of the one or more layers on the first surface of the substrate.

According to a third aspect of the present invention there is provided the use of a toughenable coated float glass substrate according to the first aspect of the present invention in a glazing article.

According to a fourth aspect of the present invention there is provided the use of a toughenable coated float glass substrate according to the first aspect of the present invention in an insulated glazing article.

According to a fifth aspect of the present invention there is provided the use of a toughenable coated float glass substrate according to the first aspect of the present invention in an automotive glazing such as for example, windscreen, sidelight, rooflight or backlight.

It will be appreciated that all features relating to the first aspect of the present invention apply also in relation to the second, third and fourth aspects of the present invention.

In the coated glass substrates according to the present invention with a protective layer of SiOx applied to the 'tin' side of the glass substrate, the coating stack preferably comprises the following sequence in order from the SiOx layer when the coating stack comprises a single silver-based functional layer:

a lower anti-reflection layer;
a silver-based functional layer;
a barrier layer; and
an upper anti-reflection layer.

Alternatively, when the coated glass substrates according to the present invention with a protective layer of SiOx applied to the 'tin' side of the glass substrate, comprises two silver layers, the coating stack preferably comprises the following sequence in order from the SiOx layer:

a lower anti-reflection layer;
a first silver-based functional layer;
a barrier layer;
a central anti-reflection layer;
a second silver-based functional layer; and
an upper anti-reflection layer.

In relation to the coating sequence used on the coated glass substrate according to the present invention, the lower anti-reflection layer may preferably comprise in sequence from the protective silicon oxide SiOx layer, a layer based on an oxide of zinc (Zn) and tin (Sn) and/or an oxide of tin (Sn); and a top layer based on an oxide of Zn.

The lower anti-reflection layer may also preferably comprise one or more base layer based on an (oxi)nitride of silicon, an (oxi)nitride of aluminium and/or alloys thereof. The one or more base layer based on an (oxi)nitride of silicon, an (oxi)nitride of aluminium and/or alloys thereof is preferably located between the protective silicon oxide SiOx layer and the layer based on an oxide of zinc (Zn) and tin (Sn) and/or an oxide of tin (Sn) in the lower anti-reflection layer.

Therefore, in an embodiment of the present invention the coated glass pane preferably comprises a base layer based on an (oxi)nitride of silicon and/or an (oxi)nitride of aluminium and/or alloys thereof located between the protective silicon oxide (SiOx) layer and the layer based on an oxide of zinc (Zn) and tin (Sn) and/or an oxide of tin (Sn). That is, the lower anti-reflection layer may comprise three layers.

For the coated glass substrate comprising a silver-based functional layer, the lower anti-reflection layer may further comprise a separation layer. The separation may preferably be based on a metal oxide and/or an (oxi)nitride of silicon and/or an (oxi)nitride of aluminium and/or alloys thereof.

In addition, the separation layer may preferably have a thickness of at least 0.5 nm; or preferably from 0.5 to 6 nm; more preferably from 0.5 to 5 nm; even more preferably from 0.5 to 4 nm; most preferably from 0.5 to 3 nm. These preferred thicknesses enable further improvement in haze upon heat treatment. The separation layer preferably provides protection during the deposition process and during a subsequent heat treatment. The separation layer is preferably either essentially fully oxidised immediately after deposition, or it oxidizes to an essentially fully oxidized layer during deposition of a subsequent oxide layer.

When the separation layer is based on a metal oxide said separation layer may preferably comprise a layer based on an oxide of: Ti, Zn, NiCr, InSn, Zr, Al and/or Si.

When the separation layer is preferably based on a metal oxide, it may be deposited using non-reactive sputtering from a ceramic target based on for example a slightly sub stoichiometric titanium oxide, for example a $TiO_{1.98}$ target, as an essentially stoichiometric or as a slightly sub stoichiometric oxide, by reactive sputtering of a target based on Ti in the presence of $O_2$, or by depositing a thin layer based on Ti which is then oxidised. In the context of the present invention, an "essentially stoichiometric oxide" means an oxide that is at least 95% but at most 100% stoichiometric, whilst a "slightly substoichiometric oxide" means an oxide that is at least 95% but less than 100% stoichiometric. The use of TiOx as a separation layer is especially preferred when the coating sequence comprises a single silver-based functional layer.

In addition to the metal oxide and/or (oxi)nitride of silicon and/or (oxi)nitride of aluminium and/or alloys thereof upon which it is based, the separation layer may further comprise one or more chemical elements chosen from at least one of the following elements: Ti, V, Mn, Co, Cu, Zn, Zr, Hf, Al, Nb, Ni, Cr, Mo, Ta, Si, or from an alloy based on at least one of these materials, used for instance as dopants or alloyants.

Preferably however, the separation layer based on a metal oxide and/or (oxi)nitride of silicon and/or (oxi)nitride of aluminium does not include one or more other chemical elements.

In one preferred embodiment of the present invention, the separation layer is based on a metal oxide, which comprises an oxide of zinc (Zn) and/or an oxide of titanium.

In another preferred embodiment of the present invention, the separation layer is based on a metal oxide, which comprises an oxide of titanium.

Whilst the separation layer may be preferably based on an oxide of titanium when the layer sequence comprises one silver-based functional layer, it may also be preferred that when the layer sequence or stack comprises more than one silver-based functional layer that the layer sequence does not comprise a separation layer in the lower anti-reflection layer.

In addition, it is preferred that when the separation layer is based on a metal oxide and the metal oxide is based on titanium oxide, that the titanium oxide has a preferred thickness of from 0.5 to 3 nm.

Whether the lower anti-reflection layer preferably comprises three, four or more layers as described above will depend upon the number of silver-based functional layers present in the sequence.

The base layer based on an (oxi)nitride of silicon and/or an (oxi)nitride of aluminium and/or alloys thereof of the lower anti-reflection layer may preferably comprise a thickness of at least 5 nm. More preferably, the base layer based on an (oxi)nitride of silicon and/or an (oxi)nitride of aluminium and/or alloys thereof of the lower anti-reflection layer comprises a thickness of from 5 to 60 nm. Even more preferably the base layer based on an (oxi) nitride of silicon and/or an (oxi)nitride of aluminium and/or alloys thereof of the lower anti-reflection layer comprises a thickness of from: 10 to 50 nm; 15 to 45 nm; or 20 to 40 nm. Most preferably the base layer based on an (oxi)nitride of silicon and/or an (oxi)nitride of aluminium and/or alloys thereof of the lower anti-reflection layer comprises a thickness of from 25 to 35 nm. This base layer serves as a glass side diffusion barrier amongst other uses.

The term "(oxi)nitride of silicon" encompasses both silicon (Si) nitride ($SiN_x$) and silicon (Si) oxinitride ($SiO_xN_y$), whilst the term "(oxi)nitride of aluminium" encompasses both aluminium (Al) nitride ($AlN_x$) and aluminium (Al) oxinitride ($AlO_xN_y$). Silicon (Si) nitride, silicon (Si) oxinitride, aluminium (Al) nitride and aluminium (Al) oxinitride layers are preferably essentially stoichiometric (for example, in silicon nitride=$Si_3N_4$, the value of x in $SiN_x$=1.33) but may also be substoichiometric or even super-stoichiometric, as long as the heat treatability of the coating is not negatively affected thereby. One preferred composition of the base layer based on an (oxi)nitride of silicon and/or an (oxi) nitride of aluminium of the lower anti-reflection layer is an essentially stoichiometric mixed nitride $Si_{90}Al_{10}N_x$.

Layers of an (oxi)nitride of silicon and/or an (oxi)nitride of aluminium may be reactively sputtered from silicon (Si-) and/or aluminium (Al)-based targets respectively in a sputtering atmosphere containing nitrogen and argon. An oxygen content of the base layer based on an (oxi)nitride of silicon and/or an (oxi)nitride of aluminium may result from residual oxygen in the sputtering atmosphere or from a controlled content of added oxygen in said atmosphere. It is generally preferred if the oxygen content of the silicon (oxi)nitride and/or aluminium (oxi)nitride is significantly lower than its nitrogen content, that is, if the atomic ratio O/N in the layer is kept significantly below 1. It is most preferred to use Si nitride and/or aluminium nitride with negligible oxygen content for the base layer of the lower anti-reflection layer. This feature may be controlled by making sure that the refractive index of the layer does not differ significantly from the refractive index of an oxygen-free Si nitride and/or aluminium nitride layer.

It is within the scope of the invention to use mixed silicon (Si) and/or aluminium (Al) targets or to otherwise add metals or semiconductors to the silicon (Si) and/or aluminium (Al) component of this layer as long as the essential barrier and protection property of the base layer of the lower anti-reflection layer is not lost. For example, the aluminium (Al) with silicon (Si) targets may be mixed, other mixed targets not being excluded. Additional components may be typically present in amounts of from 10 to 15 weight %. Aluminium is usually present in mixed silicon targets in an amount of 10 weight %.

The layer based on an oxide of zinc (Zn) and tin (Sn) and/or an oxide of tin (Sn) of the lower anti-reflection layer preferably serves to improve stability during a heat treatment by providing a dense and thermally stable layer and contributing to reduce the haze after a heat treatment. The layer based on an oxide of zinc (Zn) and tin (Sn) and/or an oxide of tin (Sn) of the lower anti-reflection layer may preferably have a thickness of at least 0.5 nm. Preferably the layer based on an oxide of zinc (Zn) and tin (Sn) and/or an oxide of tin (Sn) of the lower anti-reflection layer may have a thickness of from: 0.5 to 15 nm; or 0.5 to 13 nm; or 1 to 12 nm. In addition, the layer based on an oxide of zinc (Zn) and tin (Sn) and/or an oxide of tin (Sn) of the lower anti-reflection layer may have a thickness of from: 1 to 7 nm; or 2 to 6 nm; or 3 to 6 nm. Most preferably the layer based on an oxide of zinc (Zn) and tin (Sn) and/or an oxide of tin (Sn) of the lower anti-reflection layer may have a thickness of from 3 to 5 nm for a coated glass pane with layer sequence comprising a single silver-based functional layer. An upper thickness limit in the region of 8 nm is preferred due to optical interference conditions and by a reduction of heat treatability due to the resulting reduction in the thickness of the base layer that would be needed to maintain the optical interference boundary conditions for anti-reflecting the functional layer.

In an alternative embodiment in relation to the first aspect of the present invention, when the coated glass pane comprises more than one silver-based functional layer, the layer based on an oxide of zinc (Zn) and tin (Sn) and/or an oxide of tin (Sn) of the lower anti-reflection layer preferably has a thickness of at least 12 nm. More preferably, the layer based on an oxide of zinc (Zn) and tin (Sn) and/or an oxide of tin (Sn) of the lower anti-reflection layer preferably has a thickness of from 12 nm to 20 nm. Even more preferably, the layer based on an oxide of zinc (Zn) and tin (Sn) and/or an oxide of tin (Sn) of the lower anti-reflection layer preferably has a thickness of from 12 nm to 16 nm. However, most preferably, the layer based on an oxide of zinc (Zn) and tin (Sn) and/or an oxide of tin (Sn) of the lower anti-reflection layer preferably has a thickness of from 12 nm to 14 nm.

The layer based on an oxide of zinc (Zn) and tin (Sn) and/or an oxide of tin (Sn) of the lower anti-reflection layer is preferably located directly on a layer based on an (oxi) nitride of silicon and/or an (oxi)nitride of aluminium and/or alloys thereof.

The layer based on an oxide of zinc (Zn) and tin (Sn) (abbreviation: $ZnSnO_x$) of the lower anti-reflection layer may preferably comprise: 10 to 90 weight % zinc (Zn) and 90 to 10 weight % tin (Sn); more preferably about 40 to 60 weight % zinc (Zn) and about 40 to 60 weight % tin (Sn); even more preferably about 50 weight % each of zinc (Zn)

and tin (Sn), in weight % of the total metal content of the layer. In some preferred embodiments the layer based on an oxide of zinc (Zn) and tin (Sn) of the lower anti-reflection layer may comprise: at most 18 weight % tin (Sn), more preferably at most 15 weight % tin (Sn), even more preferably at most 10 weight % tin (Sn). The layer based on an oxide of Zn and Sn may also preferably be deposited by reactive sputtering of a mixed ZnSn target in the presence of $O_2$.

In addition to the metal oxide and/or (oxi)nitride of silicon and/or (oxi)nitride of aluminium and/or alloys thereof upon which it is based, the separation layer may further include one or more other chemical elements chosen from at least one of the following elements: Ti, V, Mn, Co, Cu, Zn, Zr, Hf, Al, Nb, Ni, Cr, Mo, Ta, Si, or from an alloy based on at least one of these materials, used for instance as dopants or alloyants.

Preferably however, the separation layer based on a metal oxide and/or (oxi)nitride of silicon and/or (oxi)nitride of aluminium does not include one or more other chemical elements.

In one preferred embodiment of the present invention, the separation layer is based on a metal oxide, which comprises an oxide of zinc (Zn) and/or an oxide of titanium.

In another preferred embodiment of the present invention, the separation layer is based on a metal oxide, which comprises an oxide of titanium.

In addition, it is preferred that when the separation layer is based on a metal oxide and that the metal oxide is based on titanium oxide, that the titanium oxide has a preferred thickness of from 0.5 to 3 nm.

However, it is preferred that when the layer sequence comprises two or more silver based functional layers, and the separation layer is based on one or more layers of an (oxi)nitride of silicon and/or (oxi)nitride of aluminium and/or alloys thereof, that the lower anti-reflection layer comprises two or more layers of may preferably be based on an oxide of titanium when the layer sequence comprises one silver-based functional layer, it may also be preferred that when the layer sequence or stack comprises more than one silver-based functional layer that the separation layer in the lower anti-reflection layer comprises two or more layers of an (oxi)nitride of silicon and/or (oxi)nitride of aluminum and/or alloys thereof.

The top layer based on an oxide of zinc (Zn) primarily functions as a growth promoting layer for a subsequently deposited silver-based functional layer. The top layer based on an oxide of zinc (Zn) is optionally mixed with metals such as aluminium (Al) or tin (Sn) in an amount of up to about 10 weight % (weight % referring to the target metal content). A typical content of said metals such as aluminium (Al) or tin (Sn) is about 2 weight %, Aluminium (Al) being actually preferred. Zinc oxide (ZnO) and mixed zinc (Zn) oxides have proven very effective as a growth promoting layer and thereby assisting in achieving a low sheet resistance at a given thickness of the subsequently deposited silver-based functional layer. It is preferred if the top layer based on an oxide of zinc (Zn) of the lower anti-reflection layer is reactively sputtered from a zinc (Zn) target in the presence of oxygen ($O_2$), or if it is deposited by sputtering, a ceramic target, for example based on ZnO:Al, in an atmosphere containing zero or only a small amount, that is, generally no more than about 5 volume %, of oxygen. The top layer of the lower anti-reflection layer based on an oxide of zinc (Zn) may preferably have a thickness of at least 2 nm. More preferably, the top layer of the lower anti-reflection layer based on an oxide of zinc (Zn) may preferably have a thickness of from 2 to 15 nm; or from 3 to 12 nm. Even more preferably the top layer of the lower anti-reflection layer based on an oxide of zinc (Zn) may preferably have a thickness of from 3 to 10 nm. Most preferably the top layer of the lower anti-reflection layer based on an oxide of zinc (Zn) has a thickness of from 3 to 8 nm.

The silver-based functional layer(s) preferably consists essentially of silver without any additive, as is normally the case in the area of low-emissivity and/or solar control coatings. It is, however, within the scope of the invention to modify the properties of the silver-based functional layer(s) by adding doping agents, alloy additives or the like or even adding very thin metal or metal compound layers, as long as the properties of the silver-based functional layer(s) necessary to function as highly light-transmitting and low light-absorbent IR-reflective layer(s), are not substantially impaired thereby.

The thickness of each silver-based functional layer is dominated by its technical purpose. For typical low-emissivity and/or solar control purposes the preferred layer thickness for a single silver-based layer may preferably be from: 5 to 20 nm; more preferably from 5 to 15 nm; even more preferably from 6 to 15 nm; even more preferably from 8 to 15 nm; most preferably from 8 to 14 nm. With such a layer thickness, light transmittance values of above 86% and a normal emissivity below 0.05 after a heat treatment may be readily achieved in accordance with the present invention for single silver coatings. If better solar control properties are required, the thickness of the silver-based functional layer may be adequately increased, or several spaced functional layers may be provided as further explained below.

Preferably the top layer based on an oxide of zinc (Zn) in the lower anti-reflection layer is in direct contact with the silver-based functional layer. Preferably, the layers between the glass substrate and the silver-based functional layer may consist of three layers, four layers or more layers of the lower anti-reflection layer described above.

While the invention relates to coated panes which comprise only one silver-based functional layer, it is preferably within the scope of the invention to apply the inventive concept to prepare low-emissivity and/or solar control coatings comprising two or more silver-based functional layers. When providing more than one silver-based functional layer, all of the silver-based functional layers are spaced apart by intervening dielectric layers, referred to herein collectively as "central anti-reflection layers", to form a Fabry-Perot interference filter, whereby the optical properties of the low emissivity and/or solar control coating may be further optimized for the respective application.

Preferably, each silver-based functional layer is spaced apart from an adjacent silver-based functional layer by an intervening central anti-reflection layer. The intervening central anti-reflection layer(s) may comprise a combination of one or more of the following layers:

a layer based on an (oxi)nitride of silicon and/or an (oxi)nitride of aluminium; a layer based on an oxide of Zn and Sn and/or an oxide of Sn; and a layer based on a metal oxide such as an oxide of Zn.

In some preferred embodiments each silver-based functional layer is spaced apart from an adjacent silver-based functional layer by an intervening central anti-reflection layer, wherein each central anti-reflection layer comprises at least, in sequence from the silver-based functional layer that is located nearest to the glass substrate, a layer based on an (oxi)nitride of silicon and/or an (oxi)nitride of aluminium; a layer based on an oxide of Zn and Sn and/or an oxide of Sn; and a layer based on a metal oxide such as an oxide of Zn.

The coated glass pane according to the present invention preferably comprises also a barrier layer. The barrier layer is preferably located in direct contact with the silver based functional layer.

The barrier layer may preferably be based on an oxide of Zn with a thickness of: at least 0.5 nm, more preferably, the barrier layer is based on an oxide of Zn with a thickness of from 0.5 to 10 nm. Most preferably the barrier layer is based on an oxide of Zn with a thickness of from 1 to 10 nm.

It has been found that a superior protection of the silver-based functional layer during the deposition process and a high optical stability during a heat treatment may be achieved if the barrier layer comprises a layer of a mixed metal oxide sputtered from a mixed metal oxide target. When the barrier layer is based on an oxide of zinc (Zn), said oxide may be a mixed metal oxide such as ZnO:Al. Good results are particularly achieved if a layer based on ZnO:Al is sputtered from a conductive ZnO:Al target. ZnO:Al may be deposited fully oxidized or such that it is slightly sub-oxidic.

In addition, it is possible when the barrier layer comprises a layer based on an oxide of zinc (Zn) for the barrier to actually comprise a number of zinc oxide layers such as layers based not only on a mixed metal oxide such as ZnO:Al, but also on an oxide of zinc (Zn) and tin (Sn). Suitable barrier layers may therefore be in the form of ZnO:Al, ZnSnO$_4$, ZnO:Al. Such triple barrier arrangements may have a combined thickness of between 3 and 12 nm.

Further triple barrier arrangements may preferably be selected from the group consisting of the following combinations of layers in sequence from the silver-based functional layer: ZnO:Al/TiO$_x$/ZnO:Al, ZnO:Al/ZnSnO$_x$/ZnO:Al, TiO$_x$/ZnSnO$_x$/ZnO:Al, TiO$_x$/ZnO:Al/TiO$_x$, TiO$_x$/ZnSnO$_x$/TiO$_x$, and ZnO:Al/ZnSnO$_x$/TiO$_x$.

At least a portion of the barrier layer that is in direct contact with the silver-based functional layer is preferably deposited using non-reactive sputtering of an oxidic target to avoid silver damage.

In addition, and as an alternative to the barrier layer being based on an oxide of zinc (Zn), it has further been found that suitable protection of the silver-based functional layer during the deposition process and a high optical stability during heat treatment may be achieved also if the barrier layer comprises a mixed metal oxide based on Nickel (Ni) and Chromium, such as a layer of substoichiometric NiCrO$_x$. This is especially the case when the coated glass pane comprises two or more silver-based functional layers, however, the layer of substoichiometric NiCrO$_x$ may also be used when the coated glass pane comprises a single silver-based functional layer.

Therefore, for coated glass panes comprising two or more silver based functional layers (or even 3 or 4 silver layers) it is preferred that each silver-based functional layer is spaced apart from an adjacent silver-based functional layer by an intervening central anti-reflection layer, wherein each central anti-reflection layer comprises at least, in sequence from the silver-based functional layer that is located nearest to the glass substrate:
  i) an uppermost barrier layer based on an oxide of nickel (Ni) and chromium or an oxide of zinc doped with aluminium (Al); and/or
  ii) a layer based on an oxide of zinc (Zn) and tin (Sn), or a layer based on an oxide of zinc and aluminium, or a layer based on a nitride of tungsten; and/or
  iii) a layer based on an (oxi)nitride of silicon and/or an (oxi)nitride of aluminium; and/or
  iv) a layer based on an oxide of zinc (Zn) and tin (Sn).

Also, in relation to the first aspect of the present invention the coated glass preferably comprises an upper anti-reflection layer. The upper anti-reflection layer preferably comprises:
  i) an uppermost barrier layer based on an oxide of nickel (Ni) and chromium or an oxide of zinc doped with aluminium (Al); and/or
  ii) a layer based on an oxide of zinc (Zn) and tin (Sn) or a layer based on zinc and aluminium, or a nitride of tungsten; and/or
  iii) a layer based on an (oxi)nitride of silicon and/or an (oxi)nitride of aluminium, or a layer based on zinc and aluminium.

The layer based on an oxide of Zn and Sn and/or an oxide of Sn in the upper anti-reflection layer may preferably have a thickness of at least 1.0 nm; more preferably at least 3 nm or 4 nm, or even at least 5 nm, but preferably at least 6 nm; more preferably at least 7 nm. In addition, the layer based on an oxide of Zn and Sn and/or an oxide of Sn in the upper anti-reflection layer preferably has a thickness of 12 nm or less; most preferably at most 10 nm; and especially from 7 to 9 nm. These preferred thicknesses enable further ease of deposition and improvement in optical characteristics such as haze whilst retaining mechanical durability.

The layer based on an oxide of Zn in the upper anti-reflection layer may preferably have a thickness of at least 0.5 nm, more preferably at least 0.5 nm or 1 nm; or even at least 1.5 nm; but preferably less than 5 nm; more preferably 4 nm. These preferred thicknesses also enable further ease of deposition and improvement in optical characteristics such as haze whilst retaining mechanical durability.

Preferably the layers in the upper anti-reflection layer are based on essentially stoichiometric metal oxides. The use of barrier layers based on essentially stoichiometric metal oxides rather than metallic or less than 95% stoichiometric barrier layers leads to an extremely high optical stability of the coating during a heat treatment and effectively assists in keeping optical modifications during heat treatment small. Additionally, the use of layers based on essentially stoichiometric metal oxides provides benefits in terms of mechanical robustness.

In the context of the present invention the term "non-reactive sputtering" includes sputtering an oxidic target in a low oxygen atmosphere (that is with zero, or up to 5% volume oxygen) to provide an essentially stoichiometric oxide.

Also, in the context of the present invention, where a layer is said to be "based on" a particular material or materials, this means unless stated otherwise, the layer predominantly comprises said material or materials in an amount of at least 50 atomic %.

Where a layer is based on ZnSnO$_x$, "ZnSnO$_x$" means a mixed oxide of Zn and Sn as described and defined elsewhere in the description.

The layer in the upper anti-reflection layer based on an (oxi)nitride of aluminium or an (oxi)nitride of silicon may preferably comprise a thickness of at least 5 nm; preferably from 5 to 50 nm; more preferably from 10 to 45 nm; even more preferably from 10 to 40 nm; most preferably from 25 to 40 nm. Such thicknesses provide further improvement in terms of mechanical robustness of the coated pane. Said layer based on an (oxi)nitride of aluminium, an (oxi)nitride of silicon, may preferably be in direct contact with the layer based on an oxide of zinc (Zn) in the upper anti-reflection layer.

The layer based on an (oxi)nitride of aluminium, an (oxi)nitride of silicon, may comprise a major part of the upper anti-reflection layer and provide stability (better protection during heat treatments) and diffusion barrier properties. Said layer is preferably deposited as an Al nitride and/or Si nitride layer by reactive sputtering of a Si, Al or mixed SiAl target, for example, of a $Si_{90}Al_{10}$ target in a $N_2$ containing atmosphere. The composition of the layer based on an (oxi)nitride of aluminium and/or an (oxi)nitride of silicon may be essentially stoichiometric $Si_{90}Al_{10}N_x$.

To minimize any light absorption in the coating and to reduce the light transmittance increase during heat treatment, all individual layers of the upper and lower anti-reflection layers are preferably deposited with an essentially stoichiometric composition.

To further optimize the optical properties of the coated pane the upper anti-reflection layers may comprise further partial layers consisting of suitable materials generally known for dielectric layers of low-e and/or solar control coatings, in particular chosen from one or more of the oxides of Sn, Ti, Zn, Nb, Ce, Hf, Ta, Zr, Al and/or Si and/or of (oxi)nitrides of Si and/or Al or combinations thereof. When adding such further partial layers it should however be verified that the heat treatability aimed at herein is not impaired thereby.

It will be appreciated that any further layer may contain additives that modify its properties and/or facilitate its manufacture, for example, doping agents or reaction products of reactive sputtering gases. In the case of oxide based layers, nitrogen may be added to the sputtering atmosphere leading to the formation of oxinitrides rather than oxides, in the case of nitride based layers oxygen may be added to the sputtering atmosphere, also leading to the formation of oxinitrides rather than nitrides.

Care must be taken by performing a proper material, structure and thickness selection when adding any such further partial layer to the basic layer sequence of the inventive pane that the properties primarily aimed at, for example, a high thermal stability, are not significantly impaired thereby.

In addition, the coated glass panes according to the present invention preferably comprise one or more absorbing layers. The one or more absorbing layers may preferably be located in the lower anti-reflection layer and/or the upper anti-reflection layer, depending on the number of silver-based functional layers.

The at least one absorbing layer may comprise a layer based on Ti, V, Cr, Fe, or W, Ni Nb, and alloys thereof and nitrides. More preferably the at least one absorbing layer is based on tungsten (W), preferably tungsten nitride.

In addition, it is preferred that the at least one absorbing layer based on tungsten is located in the lower anti-reflection layer and/or the upper anti-reflection layer.

It is also preferred in relation to the present invention, that the at least one absorbing layer preferably contacts at least one layer based on an (oxi)nitride of Si and/or an (oxi)nitride of Al and/or alloys thereof. More preferably the at least one absorbing layer is embedded between and contacts two layers based on an (oxi)nitride of Si and/or an (oxi)nitride of Al and/or alloys thereof. This arrangement is beneficial in terms of exhibiting the lowest haze and having the potential to achieve the most neutral transmitted or reflected colours before and after heat treatment.

Preferably the at least one absorbing layer contacts at least one layer based on a nitride of Al. More preferably the at least one absorbing layer is embedded between and contacts two layers based on a nitride of Al.

The absorbing layer based on tungsten, preferably in the form of tungsten nitride, WNx, in the lower and or upper anti-reflection layer may preferably have a thickness of at least 0.5 nm, more preferably at least 0.5 nm or 1 nm; or even at least 1.5 nm; but preferably less than 10 nm; more preferably 8 nm. These preferred thicknesses also enable further ease of deposition and improvement in optical characteristics such as haze whilst retaining mechanical durability.

Embodiments of the present invention will now be described by way of example only with reference to the following examples.

EXPERIMENTAL

A series of experiments were conducted to assess the impact of providing a silicon oxide ($SiO_x$) underlayer to the uncoated tin side of a sheet of float glass. After the silicon oxide layer had been applied to the 'tin' side of the float glass substrate, additional coating layers were applied atop the silicon oxide layer, the additional coating layers included at least one silver-based layer. In addition, the 'air' side of the float glass sheet was coated with a series of coating layers also.

Experiment 1—Comparison of Results for Glass Substrates Coated with a Silver-Based Low-Emissivity Coating in the Presence and Absence of a Silicon Oxide ($SiO_2$) Undercoat Layer Applied to the Tin Side of the Glass Substrate A silicon oxide (SiOx) undercoat layer was deposited onto the tin side of a float glass substrate prior to deposition of a series of coating layers (referred to as a stack); the coating layers including at least one silver based low-emissivity coating. The series of layers are identified in Table 1.

The silicon oxide (SiOx) layer and the additional coating layers were deposited on a 6 mm thick standard float glass pane with a light transmittance in the region of 88% using, single or dual magnetrons equipped with MF-AC and/or DC (or pulsed DC) power supplies.

In Table 1 the materials are listed along with the geometrical thickness of each layer in nanometres in brackets. The coating layers are obtained as follows:

Layers of an oxide of zinc (Zn) and tin (Sn) were reactively sputtered from zinc-tin targets (weight ratio Zn:Sn approximately 50:50) in an argon/oxygen ($Ar/O_2$) sputter atmosphere.

Layers of titanium oxide ($TiO_x$) layers were deposited from metallic titanium (Ti) targets in an argon/oxygen ($Ar/O_2$) sputter atmosphere.

The ZnOx layers were sputtered from Al-doped Zn targets (aluminium (Al) content about 2 weight %) in an $Ar/O_2$ sputter atmosphere.

The functional layers of essentially pure silver (Ag) were sputtered from silver targets in an Ar sputter atmosphere without any added oxygen and at a partial pressure of residual oxygen below $10^{-5}$ mbar.

The layers of silicon nitride ($SiN_x$) were reactively sputtered from mixed $Si_{90}Al_{10}$ targets in an Argon/Nitrogen ($Ar/N_2$) sputter atmosphere containing only residual oxygen.

The layers of silicon oxide (SiOx) were sputtered from mixed $Si_{90}Al_{10}$ targets in an Argon/Oxygen ($Ar/O_2$).

The layers of AlN were reactively sputtered from an Al target in an Argon/Nitrogen ($Ar/N_2$) sputter atmosphere containing only residual oxygen.

The layers of ZAO were sputtered from a ceramic ZnO:Al target (with an aluminium (Al) content in the region of 10 weight %) in an Ar/O$_2$ sputtering atmosphere.

The layers of NiCrOx were sputtered reactively from Nickel-Chromium alloy targets (with approximately 80 weight % nickel (Ni) and 20 weight % chromium (Cr)) in and Ar/O$_2$ sputtering atmosphere.

The layers of WNx were sputtered reactively from metallic W targets in an Ar/N$_2$ sputtering atmosphere.

The coating stack layers were deposited using standard process conditions.

TABLE 1 results for silver based low emissivity coating stacksapplied to float glass sheets in the presence and absence of a silicon oxide SiO$_2$ underlayer.

| | Comparative Example 1, silver based coating stack (1) with no SiO$_2$ underlayer | Example 1 silver based coating stack (1) plus SiOx underlayer | Comparative Example 2 silver based coating stack (2) with no SiO$_2$ underlayer | Example 2 Silver based coating stack (2) plus SiOx underlayer |
|---|---|---|---|---|
| | Glass | Glass | Glass | Glass |
| | — | SiOx (30) | — | SiOx (30) |
| | SiNx (25.5) | SiNx (25.5) | SiNx (18) | SiNx (18.0) |
| | ZnSnOx (3.5) | ZnSnOx (3.5) | ZnSnOx (13) | ZnSnOx (13.0) |
| | TiOx (2.5) | TiOx (2.5) | — | — |
| | ZnOx (5) | ZnOx (5) | ZnOx (3) | ZnOx (3) |
| | Ag (14.3) | Ag (14.3) | Ag (8.6) | Ag (8.6) |
| | ZAO (2) | ZAO (2) | NiCrOx (1) | NiCrOx (1) |
| | ZnSnOx (2) | ZnSnOx (2) | — | — |
| | ZAO (4) | ZAO (4) | ZAO (7) | ZAO (7) |
| | AlNx (6) | AlNx (6) | AlNx (50.5) | AlNx (50.5) |
| | WNx (2.1) | WNx (2.1) | — | — |
| | AlNx (25.5) | AlNx (25.5) | — | — |
| | ZnSnOx (7) | ZnSnOx (7) | ZnSnOx (11) | ZnSnOx (11) |
| | — | — | ZnOx (13) | ZnOx (13) |
| | — | — | Ag (17.3) | Ag (17.3) |
| | — | — | NiCrOx (1) | NiCrOx (1) |
| | — | — | ZAO (4) | ZAO (4) |
| | — | — | AlNx (21.5) | AlNx (21.5) |
| | — | — | ZnSnOx (7) | ZnSnOx (7) |
| T$_L$ AD | 58.5 | 60.6 | 63.2 | 61.9 |
| ΔT$_L$ | 1.2 | 1.4 | 7.6 | 7.6 |
| Rs AD (ohm/sq) | 2.86 | 2.97 | 1.92 | 2.01 |
| Rs HT (ohm/sq) | 2.04 | 2.02 | 1.28 | 1.33 |
| ΔRs (ohm/sq) | −0.82 | −0.95 | −0.64 | −0.68 |
| T ΔE* | 1.0 | 1.0 | 4.4 | 4.2 |
| Oil-rub | 0 | 0 | 0 | 0 |
| Hazescan | 79 | 42 | 76 | 46 |
| R$_{Film}$ | 8.8 | 8.7 | 11.7 | 12.3 |
| R$_{Glass}$ | 23.2 | 22.3 | 15.4 | 16.4 |
| ΔR$_{Film}$ | 0.8 | 1.1 | 2.5 | 2.5 |
| ΔR$_{Glass}$ | 0.2 | 0.0 | 0.3 | 0.2 |

Tables 1, 2a, 2b and 3 provide details of the layer sequences for comparative coated glass panes and coated glass panes according to the present invention along with the results of each stack tested for:

haze scan, oil rub test value, T$_L$%—percentage (%) light transmittance value for the glass substrate before heat treatment, ΔT$_L$—the change in percentage (%) light transmittance upon heat treatment, Rs AD—sheet resistance before heat treatment, Rs HT—sheet resistance after heat treatment, Δ Rs (ohm/square)—change is heat resistance, and T ΔE*—which is a measure of the change in transmitted colour upon heat treatment.

The methodology used to collect the data in Tables 1, 2a, 2b and 3 is set out below. For each example, the layers were deposited on to a glass pane in the sequence shown starting with the layer at the top of each column.

Oil rub test—an oil rub test serves to simulate the influence of cutting oils used for cutting glass panes on the mechanical robustness of a coating. Coated glass panes that do not withstand an oil rub test are difficult to process and are unsuitable for most practical applications. The coated samples defined in Table 1 (and 2) were rubbed using a felt pad with an area 1.2×1.2 cm soaked in microscope oil of refractive index 1.52 (1.515 to 1.517). The samples are subjected to 500 cycles with a 1,000 g load at a speed of 37 cycles per minute. The oil rubbed samples were then evaluated using an internal evaluation system on a perfectness scale of 0 (perfect, no damage) to 9 (part of coating stack completely removed). A score of 6 or less is preferred.

Heat treatability tests—immediately after deposition of the coatings to the glass substrate in each example in Tables 1, 2a, 2b and 3, the coating stack parameters (such as sheet resistance (Rs), light transmittance (T$_L$), haze scan, and colour co-ordinates were measured for each coated glass substrate. The coated glass substrates were then heat treated in the region of 650° C. for 5 minutes 30 seconds. Thereafter, the haze scan value, sheet resistance (Rs), percentage light transmittance and reflectance of both surfaces (T$_L$, R$_{Film}$, R$_{Glass}$) and colour coordinates were again measured and the change in light transmittance and reflectance from both sides (ΔT$_L$, ΔR$_{Film}$, ΔR$_{Glass}$), and the change in colour upon heat treatment (ΔE*), calculated therefrom.

The values stated for the change in percentage (%) light transmittance and reflectance upon heat treatment of the coated glass pane Examples in Tables 1 and 3 were derived from measurements according to EN 410, the details of which are incorporated herein by reference.

Sheet Resistance/Change in sheet resistance for examples—sheet resistance measurements were made using a NAGY SRM-12. This device utilises an inductor to generate eddy currents in a 100 mm×100 mm coated sample. This produces a measurable magnetic field, the magnitude of which is related to the resistivity of the sample. With this method the sheet resistance can be calculated. The instrument was used to measure the sheet resistance of samples before and after heat treatment at 650° C. for 5 minutes, 30 seconds.

Colour characteristics—the colour characteristics for each of sample 1 to 14 were measured and reported using the well-established CIE LAB L*, a*, b* coordinates (as described for example in paragraphs [0030] and [0031] of WO 2004/063111A1, incorporated herein by reference). The change in transmission colour upon heat treatment, T ΔE*= ((Δa*)$^2$+(Δb*)$^2$+(ΔL*)$^2$)$^{1/2}$, wherein ΔL*, Δa* and Δb* are the differences of the colour values L*, a*, b* of the coated glass pane each before and after a heat treatment. ΔE* values of less than 3 (for example 2 or 2.5) are preferred for layer sequences with one silver-based functional layer, representing a low and practically non-noticeable colour modification caused by the heat treatment. For layer sequences comprising two or more silver-based functional layer, lower T ΔE* values provide an indication of the stability of the sequences; the lower the T ΔE* values the more superior the results and appearance of the coated glass pane.

Haze scan—A haze scoring system was applied to each example. The quality assessment evaluation system described hereinafter was also used to more clearly distinguish the visual quality of coatings under bright light conditions; properties that are not fully reflected by standard haze values measured in accordance with ASTM D 1003-61.

The evaluation system considers the more macroscopic effect of visible faults in the coating which cause local colour variations where the coating is damaged or imperfect (haze scan in Table 1). This assessment analyses the light levels in images of heat-treated samples taken using fixed lighting conditions and geometries.

To generate the images used to calculate haze scan values, samples are placed inside a black box, 30 cm away from the camera lens. Samples are illuminated using a standard 1200 lumen light with a brightness between 2400 and 2800 Lux, as measured at the samples position. The sample is then photographed using a standard aperture size and exposure length. The greyscale of each pixel in the resulting image is then recorded, with a value of 0 representing black and 255 representing white. Statistical analysis of these values is undertaken to give an overall assessment of the haze of the sample, referred to herein as the haze scan value. The lower the haze scan value recorded, the more superior the results.

Experiment 2a and 2b—Comparison of Glass Substrates Coated with a Silver Based Low-Emissivity Coating in the Presence of Varying Thicknesses of a Silicon Oxide ($SiO_2$) Undercoat Layer In experiments 2a and 2b, various thicknesses of a layer of silicon oxide (SiOx) undercoat layer were deposited on a float glass substrate prior to deposition of each of the silver based low-emissivity coating stacks detailed in Table 1 for examples 1 and 2. That is, the silicon oxide undercoat layer was applied to the tin side of a float glass substrate before deposition of the silver based low-emissivity coating stack of example 1 listed in Table 1.

The silicon oxide (SiOx) layers were deposited on the tin side of a series of 6 mm float glass substrates at thicknesses of 7.5 mm (example 1 only), 15 nm, 30 nm and 60 nm.

Tables 2a and 2b include details of the haze scan results and mean distribution values for the silver based low-emissivity coatings detailed in examples 1 and 2 in Table 1 respectively, applied to float glass sheets in the presence of varying thickness of $SiO_2$ underlayer.

TABLE 2a

| Example | Example details | Haze scan values |
|---|---|---|
| 4 | 6 mm float glass with no $SiO_2$ coating layer and a Ag based low-emissivity coating of comparative example 1 on the glass tin side | 79 |
| 5 | 6 mm float glass with 7.5 nm $SiO_2$ coating layer on glass tin side followed by the deposition of the Ag based low-emissivity coating of example 1 also on the glass tin side | 63 |
| 6 | 6 mm float glass with 15 nm $SiO_2$ coating layer on glass tin side followed by the deposition of the Ag based low-emissivity coating of example 1 also on the glass tin side | 50 |
| 7 | 6 mm float glass with 30 nm $SiO_2$ coating layer on glass tin side followed by the deposition of the Ag based low-emissivity coating of example 1 also on the glass tin side | 42 |
| 8 | 6 mm float glass with 60 nm $SiO_2$ coating layer on glass tin side followed by the deposition of the Ag based low-emissivity coating of example 1 also on the glass tin side | 40 |

In each of examples 4 to 8 a pyrolytic silica/titania based coating was applied to the glass air side.

TABLE 2b

| Example | Example details | Haze scan values |
|---|---|---|
| 3 | 6 mm float glass with no coating on glass tin side and a pyrolytic silica/titania based coating on the glass air side | 19.2 |
| 9 | 6 mm float glass with no $SiO_2$ coating layer on the glass tin side and with the Ag based low-emissivity coating of comparative example 2 deposited on the glass tin side | 75.6 |
| 10 | 6 mm float glass with 15 nm $SiO_2$ coating layer on glass tin side followed by the deposition of the Ag based low-emissivity coating of example 2 also on the glass tin side | 61.0 |
| 11 | 6 mm float glass with 30 nm $SiO_2$ coating layer on glass tin side followed by the deposition of the Ag based low-emissivity coating of example 2 also on the glass tin side | 45.6 |
| 12 | 6 mm float glass with 60 nm $SiO_2$ coating layer on glass tin side followed by the deposition of the Ag based low-emissivity coating of example 2 also on the glass tin side | 47.0 |

In each of examples 9 to 12 a pyrolytic silica/titania based coating was applied to the glass air side.

As can be seen from Tables 2a and 2b, improved haze scan results were obtained when the silicon oxide ($SiO_2$) layer was applied to the float glass substrate in a thickness range of 30 to 60 nm. The haze scan measurements were recorded as described above in which a haze scoring system is applied to each of the examples in Tables 2a and 2b using a photographic methodology which analyses an image taken of each sample and then expresses the observed data as a "mean haze" value.

Photographs demonstrating the benefit of including a silicon oxide (SiOx) underlayer are provided in FIGS. 1 and 2.

Experiment 3—Comparison of a Float Glass Substrate Coated with a Silicon Oxide ($SiO_2$) Underlayer and a Silicon Nitride-Based Layer Versus Float Glass Substrates Coated with a Silicon Nitride Base Layer Only A further advantage related to the use of silicon oxide underlayer (SiOx) as a protective coating layer applied to the tin side of a float glass substrate and located between the glass substrate and further layers including at least one sputter deposited metal layer is that, the refractive index of the silicon oxide (SiOx) underlayer (1.54) is very close to that of the glass substrate (1.51). Consequently, the required optical properties provided by for example a subsequent low-emissivity and solar control coating is largely maintained with only small changes to the appearance of the coated glass pane being observed. This is illustrated by a comparison of a coating with variants of the same coating including either 50 nm of SiOx as a protective layer (Example 14) and also, the same coating whereby the base SiNx layer thickness is increased by 50 nm (Example 15). Details of the layer sequences are provided in Table 3.

TABLE 3

|  | Comparative Example 13 Stack with SiNx base layer only | Example 14 Stack with SiNx base layer and 50 nm SiOx underlayer | Example 15 Stack with thicker SiNx layer |
|---|---|---|---|
| Air side | CVD coating Glass | CVD coating Glass | CVD coating Glass |
| Tin Side | — | SiOx (50) | — |
|  | SiNx (18) | SiNx (18) | SiNx (68) |
|  | ZnSnOx (13) | ZnSnOx (13) | ZnSnOx (13) |
|  | ZnOx (3) | ZnOx (3) | ZnOx (3) |
|  | Ag (8.6) | Ag (8.6) | Ag (8.6) |
|  | NiCrOx (1) | NiCrOx (1) | NiCrOx (1) |
|  | ZAO (7) | ZAO (7) | ZAO (7) |
|  | AlNx (51) | AlNx (51) | AlNx (51) |
|  | ZnSnOx (11) | ZnSnOx (11) | ZnSnOx (11) |
|  | ZnOx (13) | ZnOx (13) | ZnOx (13) |
|  | Ag (17.3) | Ag (17.3) | Ag (17.3) |
|  | NiCrOx (1) | NiCrOx (1) | NiCrOx (1) |
|  | ZAO (4) | ZAO (4) | ZAO (4) |
|  | AlNx (22) | AlNx (22) | AlNx (22) |
|  | ZnSnOx (7) | ZnSnOx (7) | ZnSnOx (7) |
| $T_L$ | 63.7 | 63.2 | 59.7 |
| $\Delta T_L$ | 8.3 | 7.3 | 8.8 |
| T $\Delta E^*$ | 4.7 | 4.5 | 5.5 |
| $R_{Film}$ | 13.4 | 14.5 | 16.8 |
| $R_{Glass}$ | 15.8 | 16.8 | 21.5 |
| $\Delta R_{Film}$ | 3.3 | 2.2 | 1.5 |
| $\Delta R_{Glass}$ | 0.2 | 1.0 | −1.2 |

A comparison of the CIE L*, a* and b* values measured for examples 13, 14 and 15 described in Table 3 with a pyrolytic (CVD) coating on the 'air' side of the float glass substrate and a low-emissivity coating deposited on the tin side, both before and following heat treatment at 650° C. for 5 minutes, are provided in Tables 4 and 5.

That is, the change in transmission colour upon heat treatment was measured, T $\Delta E^* = ((\Delta a^*)^2 + (\Delta b^*)^2 + (\Delta L^*)^2)^{1/2}$, wherein $\Delta L^*$, $\Delta a^*$ and $\Delta b^*$ are the differences of the colour values L*, a*, b* of the coated glass pane each before and after a heat treatment. $\Delta E^*$ values of less than 3 (for example 2 or 2.5) are preferred for layer sequences with one silver-based functional layer, representing a low and practically non-noticeable colour modification caused by the heat treatment. For layer sequences comprising two or more silver-based functional layer, lower T $\Delta E^*$ values provide an indication of the stability of the sequences; the lower the T $\Delta E^*$ values the more superior the results and appearance of the coated glass pane.

From Tables 4 and 5 it can be seen that in relation to Example 14, it is possible to obtain toughening of a coated substrate according to the present invention whilst achieving acceptable colour changes after heat treatment. In contrast, comparative Example 15, is not as resilient to toughening and the increased thickness of the SiNx layer leads to unacceptable yellowing of the coating in relation to the colour of the coated glass substrate when viewed in transmission.

Tables 6 and 7 illustrate the difference in the CIE L*, a* and b* values measured for each side of float glass Examples 14 and 15 described above, compared with the values recorded for comparative example 13, which has no modification to the layer thicknesses and has no SiOx protection layer present.

In addition, it can be seen from Tables 6 and 7 that whilst the presence of a $SiN_3$ layer offers some improvement in the imperfections observed when the stack of Example 15 is deposited on the tin side of a float glass substrate and heat treated, using such a coating layer, especially when a thicker layer is deposited, results in a change to the observed colour of the float glass both before and after heat treatment, rendering a glass substrate coated with such a layer undesirable in terms of colour and aesthetic appearance.

TABLE 4 provides the colour measurements recorded for the coatings of Examples 13, 14 and 15 before heat treatment.

MEASUREMENTS FOR COATED FLOAT GLASS AS DEPOSITED (BEFORE HEAT TREATMENT)

|  |  | Transmission | | | | 'Tin' Side Reflection | | | | 'Air' Side Reflection | | | |
|---|---|---|---|---|---|---|---|---|---|---|---|---|---|
|  |  | Y | L* | a* | b* | Y | L* | a* | b* | Y | L* | a* | b* |
| Comparative Example 13 | Side 1 - CVD coating on air side | 63.67 | 83.79 | −6.18 | 1.13 | 13.41 | 43.37 | 6.94 | −4.37 | 15.75 | 46.65 | 1.17 | −14.59 |
|  | Side 2 - coating of c.example 13 on tin side | | | | | | | | | | | | |
| Example 14 | Side 1 - CVD coating on air side | 63.20 | 83.55 | −5.80 | 0.08 | 14.52 | 44.96 | 6.57 | −0.60 | 16.78 | 47.98 | −0.51 | −11.29 |
|  | Side 2 - coating of example 14 on tin side | | | | | | | | | | | | |
| Comparative Example 15 | Side 1 - CVD coating on air side | 59.69 | 81.67 | −3.00 | 10.11 | 16.83 | 48.04 | −14.01 | −16.37 | 21.45 | 53.44 | −6.98 | −24.08 |
|  | Side 2 - coating of c.example 15 on tin side | | | | | | | | | | | | |

TABLE 5 provides the colour measurements recorded for the coatings of Examples 13, 14 and 15 after heat treatment.

MEASUREMENTS FOR COATED GLASS AS DEPOSITED (AFTER HEAT TREATMENT)

| | | Transmission | | | | 'Tin' Side Reflection | | | | 'Air' Side Reflection | | | |
|---|---|---|---|---|---|---|---|---|---|---|---|---|---|
| | | Y | L* | a* | b* | Y | L* | a* | b* | Y | L* | a* | b* |
| Comparative Example 13 | Side 1 - CVD coating on air side Side 2 - coating of c.example 13 on tin side | 71.96 | 87.95 | −5.11 | 2.92 | 15.05 | 45.7 | 5.91 | −5.96 | 15.96 | 46.92 | 2.91 | −12.49 |
| Example 14 | Side 1 - CVD coating on air side Side 2 - coating of example 14 on tin side | 70.51 | 87.24 | −4.52 | 2.29 | 16.65 | 47.82 | 4.64 | −2.84 | 17.79 | 49.24 | 1.07 | −9.30 |
| Comparative Example 15 | Side 1 - CVD coating on air side Side 2 - coating of c.example 15 on tin side | 68.50 | 86.26 | −1.77 | 12.93 | 18.26 | 49.81 | −8.80 | −21.18 | 20.26 | 52.13 | −5.25 | −25.11 |

TABLE 6

Difference in colour to comparative Example 13 before heat treatment.

| | | Transmission | | | | 'Tin' Side Reflection | | | | 'Air' Side Reflection | | | |
|---|---|---|---|---|---|---|---|---|---|---|---|---|---|
| | | Y | L* | a* | b* | Y | L* | a* | b* | Y | L* | a* | b* |
| Example 14 | Side 1, CVD coating on air side Side 2, coating of example 14 on tin side | −0.47 | −0.24 | 0.38 | −1.05 | 1.11 | 1.59 | −0.37 | 3.77 | 1.03 | 1.33 | −1.68 | 3.30 |
| Comparative Example 15 | Side 1, CVD coating on air side Side 2, coating of example 15 on tin side | −12.27 | −6.28 | 2.11 | 7.19 | 3.42 | 4.67 | −20.95 | −12.00 | 5.70 | 6.79 | −8.15 | −9.49 |

TABLE 7

Difference in colour to comparative Example 13 after heat treatment.

| | | Transmission | | | | 'Tin' Side Reflection | | | | 'Air' Side Reflection | | | |
|---|---|---|---|---|---|---|---|---|---|---|---|---|---|
| | | Y | L* | a* | b* | Y | L* | a* | b* | Y | L* | a* | b* |
| Example 14 | Side 1, CVD coating on air side Side 2, coating of example 14 on tin side | −1.45 | −0.71 | 0.59 | −0.63 | 1.60 | 2.12 | −1.27 | 3.12 | 1.83 | 2.32 | −1.84 | 3.19 |
| Comparative Example 15 | Side 1, CVD coating on air side Side 2, coating of example 15 on tin side | 4.83 | 2.47 | 4.41 | 11.8 | 3.21 | 4.11 | −14.71 | −15.22 | 4.30 | 5.21 | −8.16 | −12.62 |

TABLE 8

Summary of the changes in CIE lab measurements recorded for Example 15, 16 and 17 after heat treatment.

| | | Transmission | | | | 'Tin' Side Reflection | | | | 'Air' Side Reflection | | | |
|---|---|---|---|---|---|---|---|---|---|---|---|---|---|
| | | ΔL* | Δa* | Δb* | ΔE* | ΔL* | Δa* | Δb* | ΔE* | ΔL* | Δa* | Δb* | ΔE* |
| Comparative Example 15 | Tin side | 4.16 | 1.07 | 1.79 | 4.65 | 2.33 | −1.03 | −1.59 | 3.00 | 0.27 | 1.74 | 2.1 | 2.74 |
| Example 16 | Tin side | 3.69 | 1.28 | 2.21 | 4.49 | 2.86 | −1.93 | −2.24 | 4.11 | 1.26 | 1.58 | 1.99 | 2.84 |
| Comparative Example 17 | Tin side | 4.59 | 1.23 | 2.82 | 5.53 | 1.77 | 5.21 | −4.81 | 7.31 | −1.31 | 1.73 | −1.03 | 2.40 |

It can be seen from the results in Tables 6 and 7 that only a minor difference of 5 units or less is observed for the values of L*, a* or b* for comparative Example 13 compared with Example 14, with the additional layer of SiOx as a protection layer.

In contrast, a comparison of the values for L*, a* or b* for Example 14 compared with comparative Example 15, with a thicker base SiNx layer, revealed differences of up to 29.89 units.

An additional benefit highlighted by the results of Table 8 is that the change in the values of L*, a*, b* and ΔE for comparative Examples 13, 15 and Example 14 following heat treatment to 650° C. for 5 minutes, is very small for Example 14 with the SiOx protection layer. Additionally, the measured values for Example 14 were closer to those of Example 13 (the un-modified stack) in contrast to the values obtained for Example 15 (stack with a thicker SiNx layer).

For the results provided in summary Table 8, indicating the change in values observed for the coated glass substrates after heat treatment, changes in the recorded values for ΔE* for the transmission and reflection on the coated glass of less than 10 are preferred. Values observed for the coated glass substrates after heat treatment, changes in the recorded values for ΔE* for the transmission and reflection on the coated glass of less than 5 are highly preferred.

Experiment 4—Inclusion of a Visible Light Absorbing Layer

In another embodiment of the present invention, the inclusion of a visible light absorbing layer (for example Tungsten nitride, WNx) in the lower antireflection layer of the coating stack was investigated. It was found by the inventors that by including a visible light absorbing layer in the lower antireflection layer of the coating stack, that an additional benefit may be achieved, namely that of shifting the transmitted colour value to a substantially more negative b* value (that is, the value for blue colour in transmission) whilst maintaining negative b* values in reflection for both faces of the coated glass pane.

This is especially desirable when producing double sided coatings wherein the first coating applied for example by CVD comprises materials that are reflective in the blue region of the visible spectrum, since the CVD coating has the effect of increasing the resultant transmission b* value of the coated article and therefore providing the coated glass pane a yellowish appearance in transmission. That is, the inventors have found that it is possible to avoid the appearance of yellowing of the coating by adding a visible light absorbing layer such as tungsten nitride, WNx in the lower antireflection layer of the coating sequence.

Another benefit of the additional visible light absorbing layer is that the reflected colour on both faces of the coated pane are significantly blue in all cases that is the value of b* is −15 or lower. Even more beneficial is the fact that the reflected colours all display a negative value of a*.

A series of coatings were deposited onto the tin side of a float glass pane as described in Table 9, with a pyrolytic (CVD) coating on the air side of the float glass pane. The pyrolytic (CVD) coating is a silicon and titanium-based coating available under the tradename Pilkington Activ™. (examples 1 and 2 included for comparison) The beneficial effect on colour observed for the as deposited values are illustrated in Table 10 and the post heat treatment values in Table 11.

TABLE 9

|  | Comparative Example 16 | Comparative Example 17 | Example 23 | Example 24 | Example 25 |
|---|---|---|---|---|---|
| Air side | CVD coating | CVD coating | CVD coating | CVD coating | CVD coating |
| Tin side | Glass | Glass | Glass | Glass | Glass |
|  | SiOx 60 | SiOx 60 | SiOx 50 | SiOx 60 | SiOx 60 |
|  | SiNx 18 | SiNx 26 | SiNx 21 | SiNx 19.5 | SiNx 19.5 |
|  | — | — | WNx 3 | WNx 4.2 | WNx 3.1 |
|  | — | — | SiNx 19 | SiNx 16.5 | SiNx 11 |
|  | ZnSnOx 13 | ZnSnOx 13 | ZnSnOx 13 | ZnSnOx 13 | ZnSnOx 13 |
|  | ZnOx 3 | ZnOx 3 | ZnOx 5 | ZnOx 3 | ZnOx 3 |
|  | Ag 8.6 | Ag 7.6 | Ag 12.9 | Ag 9.4 | Ag 8.9 |
|  | NiCrOx 1 | NiCrOx 0.9 | NiCrOx 1 | NiCrOx 0.5 | NiCrOx 0.5 |
|  | AZO 7 | AZO 7 | AZO 3 | AZO 6 | AZO 6 |
|  | AlNx 51 | AlNx 50.1 | AlNx 24 | AlNx 15.5 | AlNx 15.5 |
|  | ZnSnOx 11 | ZnSnOx 11 | ZnSnOx 11 | ZnSnOx 11 | ZnSnOx 11 |
|  | ZnOx 13 | ZnOx 16 | ZnOx 5 | ZnOx 8.5 | ZnOx 8.5 |
|  | Ag 17.3 | Ag 16.7 | Ag 11.9 | Ag 11.2 | Ag 11.8 |
|  | NiCrOx 1 | NiCrOx 1 | NiCrOx 1 | NiCrOx 1 | NiCrOx 1 |
|  | — | WNx 16 | WNx 3 | WNx 6.5 | WNx 4.2 |
|  | AZO 4 | — | AlNx 37.5 | AlNx 32 | AlNx 33.5 |
|  | ZnSnOx 7 | ZnSnOx 9 | ZnSnOx 5 | ZnSnOx 9 | ZnSnOx 9 |

TABLE 10

CIE LAB COLOUR MEASUREMENTS FOR EXAMPLES 16 TO 20 BEFORE HEAT TREATMENT

|  | Transmission | | | | 'Tin' Side Reflection | | | | 'Air' Side Reflection | | | |
|---|---|---|---|---|---|---|---|---|---|---|---|---|
|  | Y | L | a* | b* | Y | L | a* | b* | Y | L | a* | b* |
| Example 16 (comparative) | 63.2 | 83.55 | −5.80 | 0.08 | 14.52 | 44.96 | 6.57 | −0.60 | 16.78 | 47.98 | −0.51 | −11.29 |
| Example 17 (comparative) | 45.34 | 73.12 | −3.61 | 0.88 | 19.48 | 51.24 | −0.35 | 13.39 | 20.4 | 52.28 | −4.39 | −9.83 |
| Example 18 | 16.99 | 48.25 | 2.52 | −9.65 | 10.68 | 39.04 | −13.50 | −9.90 | 23.16 | 55.24 | −5.81 | −18.47 |
| Example 19 | 18.29 | 49.84 | 1.00 | −7.62 | 6.85 | 31.44 | −12.52 | −15.63 | 20.35 | 52.23 | −3.77 | −21.24 |
| Example 20 | 25.67 | 57.72 | 0.24 | −2.67 | 11.42 | 40.28 | −8.426 | −14.74 | 19.50 | 51.27 | −1.84 | −19.23 |

TABLE 11

CIE LAB COLOUR MEASUREMENTS FOR EXAMPLES 16 TO 20 AFTER HEAT TREATMENT

|  | Transmission | | | | 'Tin' Side Reflection | | | | 'Air' Side Reflection | | | |
| --- | --- | --- | --- | --- | --- | --- | --- | --- | --- | --- | --- | --- |
|  | Y | L | a* | b* | Y | L | a* | b* | Y | L | a* | b* |
| Example 16 (comparative) | 70.51 | 87.24 | −4.52 | 2.29 | 16.65 | 47.82 | 4.64 | −2.84 | 17.79 | 49.24 | 1.07 | −9.30 |
| Example 17 (comparative) | 49.56 | 75.80 | −2.45 | 1.57 | 20.25 | 52.12 | −1.20 | 15.36 | 20.05 | 51.89 | −3.30 | −8.58 |
| Example 18 | 19.44 | 51.19 | 3.02 | −10.6 | 13.99 | 44.22 | −12.90 | −7.09 | 23.89 | 55.98 | −5.90 | −19.01 |
| Example 19 | 20.40 | 52.28 | 1.27 | −7.6 | 8.12 | 34.21 | −11.44 | −15.01 | 20.28 | 52.14 | −3.32 | −22.45 |
| Example 20 | 28.91 | 60.71 | 0.38 | −2.51 | 13.45 | 43.43 | −7.26 | −13.41 | 19.71 | 51.5 | −1.43 | −19.92 |

It can be seen from the above discussion and results that a key advantage of the present invention is that it enables the production of glass sheets provided with a combination of chemical vapour deposition (CVD) and physical vapour deposition (PVD) or sputtered coating layers applied to opposing faces of float glass sheets which may be subsequently heat treated or toughened.

A further benefit provided by the present invention is that it maximises the advantages derived from both types of deposition methods applied to glass substrates. For instance, self-cleaning coatings deposited by for example CVD, may be applied to one side of the glass sheet, as these have been shown to display much higher levels of photoactivity than purely sputtered counterparts, whilst, silver-based low-emissivity (low-e) coating, which is known to have lower haze, sheet-resistance and greater selectivity for low-e/solar control purposes, may be deposited on the second side of the glass substrate, which has superior performance to a low-e coating deposited by CVD.

Whilst coated glass products do exist which take advantage of multiple technologies, in contrast to the present invention such products cannot be thermally tempered.

Also, even though products exist which do use multiple technologies to produce coatings and which may be toughened or annealed, the selectivity of such products is limited, and the performance of the products poor as the coatings do not include a silver layer.

By combining technologies in a single dual coated glass pane according to the present invention, in which sputtered coatings are deposited on the tin side of a float glass substrate (that is, the lower surface during formation and annealing of the float glass ribbon) and a CVD coating layers is deposited on the atmosphere (or air/gas) side of the float glass (upper surface during formation and annealing of the float glass ribbon inside the float bath), the present invention avoids the limitation of normal practice which is only to sputter deposit onto the atmosphere side of the glass substrate (as this side does not come into contact with rollers during the manufacture of the glass substrate and which may lead to marks and imperfections on the sputtered coatings), whilst maintaining high quality sputtered coatings, The present invention therefore overcomes problems associated with the previous production of such products and which leads to damage of the sputtered coatings after thermal tempering or caused by contact with various types of rollers used in the float glass manufacturing process, particularly in the lehr, and which often only becomes apparent upon toughening, being demonstrated by an improvement in the hazescan values of at least 25%.

Alternative methods exist whereby a thermally toughened glass pane with for example a CVD coating present on one face and a sputtered, silver containing coating present on the second face of the substrate could be produced. One example of this is would be to thermally toughen cut-size plates of CVD coated glass and to subsequently deposit a silver based PVD coating onto the opposite face of the already cut to size and toughened glass however the disadvantages of such an approach are numerous and include inefficient utilisation of the PVD coating equipment, additional labour to manually load the cut-size plates onto the equipment and additional complexity to the supply chain increasing both cost and time taken to produce the toughened plate provided with a CVD coating on one surface and a silver based PVD coating on the opposite face.

A second alternative method of producing such an end-product could be to laminate together two toughened coated glass panes, one of which is provided with a CVD coating on one face and the other provided with a silver based PVD coating on one face. Such a laminated glass pane allows the processor to avoid deposition of a toughenable coating on the tin side of the glass substrate. However, this approach dramatically increases the cost to produce the final glass pane and requires the producer to hold stock of two separate products which must be processed separately and then laminated together.

The present invention avoids both of the difficult scenarios described above and allows the production of a thermally toughened glass pane provided with a CVD coating on one surface of the glass substrate and a silver based PVD coating on the second face of the glass substrate in the most efficient and cost-effective manner.

As the refractive index of the SiOx protective layer described by the present invention is close to that of the glass substrate, this affords a further benefit to the invention in that the inclusion of said protective layer makes only a small difference to the appearance of the coated glass pane, particularly when viewed in transmission and even more particularly in terms of the transmitted b*. If alternative materials such as SiNx are used (which have a refractive index higher than that of the SiOx protective layer described by the invention) then the appearance of the coated glass pane is much changed and often, this is in the form of very high values for transmission b* of over 10 units. This gives the coated glass pane a yellowish appearance when viewed in transmission which is aesthetically unappealing. In contrast, a similar product produced with an equivalent thickness of SiOx used as a protective layer according to the present invention not only exhibits superior toughening performance (that is lower haze) but also has substantially lower values of transmission b* of below 10 units, more preferably below 8 units and even more preferably below 6 units, which is aesthetically more pleasing to the observer.

A further benefit of the present invention is that as well as providing the benefits described above, the invention also maintains a pleasing appearance when viewed in reflection, in particular the air side reflection (that is the reflection of the surface provided with a CVD coating which would be outermost when constructed into an insulating glazing unit). Monolithic panes produced according to the invention typically have air side reflection a* values in the range 10 to −10 units, more preferably between 7 and −10 units and even more preferably between 5 and −10 units. At the same time the values recorded for air side reflection b* are typically negative (that is blue in appearance) and preferably in the range of 0 to −30 units, more preferably in the range −2 to −27 units and even more preferably in the range −4 to −25 units.

The invention claimed is:

1. A toughenable coated float glass substrate, said float glass substrate comprising:
   i) a first surface; and
   ii) a second surface, wherein
   the first surface comprises one or more layers applied by chemical vapour deposition (CVD) and the second surface comprises one or more layers applied by physical vapour deposition (PVD);
   wherein said one or more layers applied by physical vapour deposition (PVD) includes at least one functional metal layer;
   wherein the second surface further comprises a protective layer applied in direct contact with the second surface;
   wherein the coated float glass substrate exhibits a transmission b* colour value according to the CIE colour space of less than or equal to 3 and a first surface reflection b* of less than or equal to −5;
   wherein the protective layer comprises a layer of silicon oxide (SiOx), wherein x is in the range 1.5 to 2.0;
   wherein the functional metal layer comprises silver; and
   wherein the second surface comprises a layer of silicon nitride directly upon the protective layer.

2. The toughenable coated substrate according to claim 1, wherein according to the CIE colour space b* and a* are negative with respect to first surface reflection.

3. The toughenable coated substrate according to claim 1, wherein the protective layer is applied by physical vapour deposition (PVD).

4. The toughenable coated substrate according to claim 1, wherein the thickness of the protective layer is in the range 10 to 100 nm.

5. The toughenable coated substrate according to claim 1, wherein the thickness of the protective layer is in the range 30 to 70 nm.

6. The toughenable coated substrate according to claim 1, wherein the second surface of the float glass contacted molten tin during manufacture and wherein the first surface of the float glass contacted a bath atmosphere comprising nitrogen and hydrogen during manufacture.

7. The toughenable coated substrate according to claim 1, wherein the one or more layers applied by chemical vapour deposition (CVD) to the first surface of the glass substrate comprise one or more doped or undoped oxide layers selected from:
   silicon oxide ($SiO_2$), tin oxide ($SnO_2$), fluorine doped tin oxide ($SnO_2$:F), titanium oxide ($TiO_2$) and antimony doped tin oxide ($SnO_2$:Sb).

8. The toughenable coated substrate according to claim 1, wherein the change in colour for transmission after heat treatment ($\Delta E^*$) for the coated substrate is less than or equal to 10.

9. The toughenable coated substrate according to claim 1, wherein the change in colour for reflection after heat treatment ($\Delta E^*$) for each side of the coated substrate is less than or equal to 10.

10. The toughenable coated substrate according to claim 1, wherein the said one or more layers applied by physical vapour deposition (PVD) includes at least one absorbing layer, wherein the absorbing layer is based on a material selected from the group consisting of Ti, V, Cr, Fe, W, Ni, Nb, alloys thereof and nitrides thereof.

11. The toughenable coated substrate according to claim 10, wherein the at least one absorbing layer comprises tungsten (W).

12. The toughenable coated substrate according to claim 10, wherein the at least one absorbing layer comprises tungsten nitride.

13. The process for preparing a dual coated toughenable float glass substrate according to claim 1, comprising the steps of:
   i) providing a float glass substrate with a first surface and a second surface, wherein the second surface of the glass substrates contacts molten tin during manufacture and the first surface contacts a bath atmosphere comprising nitrogen and hydrogen during manufacture;
   ii) depositing by chemical vapour deposition (CVD) one or more layers on the first surface of the substrate;
   iii) depositing by physical vapour deposition (PVD) one or more layers on the second surface of the substrate;
   iv) depositing by physical vapour deposition (PVD), a protective layer directly on the glass substrate prior to depositing the one or more layers on the second surface, wherein the protective layer comprises a thickness of between 10 nm and 100 nm;
   v) depositing a layer of silicon nitride directly upon the protective layer; and
   vi) heat treating the coated glass substrate to toughen the glass without degrading the one or more layers deposited on each side of the substrate.

14. The process according to claim 13, wherein the protective layer is deposited to a thickness in the range of 30 nm and 70 nm.

15. A toughenable coated float glass substrate, said float glass substrate comprising:
   i) a first surface; and
   ii) a second surface,
   wherein the first surface comprises one or more layers applied by chemical vapour deposition (CVD) and the second surface comprises one or more layers applied by physical vapour deposition (PVD);
   wherein said one or more layers applied by physical vapour deposition (PVD) includes at least one functional metal layer;
   wherein the second surface further comprises a protective layer applied in direct contact with the second surface;
   wherein the coated float glass substrate exhibits a transmission b* colour value according to the CIE colour space of less than or equal to 3 and a first surface reflection b* of less than or equal to −5;
   wherein the protective layer comprises a layer of silicon oxide (SiOx), wherein x is in the range 1.5 to 2.0;
   wherein the protective layer is applied by physical vapour deposition (PVD);
   wherein the functional metal layer comprises silver; and
   wherein the second surface comprises a layer of silicon nitride directly upon the protective layer.

* * * * *